US012701193B2

(12) United States Patent
Arbuzov et al.

(10) Patent No.: US 12,701,193 B2
(45) Date of Patent: Aug. 4, 2026

(54) SYSTEM AND METHOD FOR REDUCING SUBSCRIBER CHURN THROUGH COMPLIMENTARY DATA ALLOCATIONS

(71) Applicant: DISH Network L.L.C., Englewood, CO (US)

(72) Inventors: Mikhail Arbuzov, Santa Clara, CA (US); Sisong Bei, Dublin, CA (US); Dmitry Dimov, San Francisco, CA (US)

(73) Assignee: DISH Network L.L.C., Englewood, CO (US)

( * ) Notice: Subject to any disclaimer, the term of this patent is extended or adjusted under 35 U.S.C. 154(b) by 283 days.

(21) Appl. No.: 18/540,588

(22) Filed: Dec. 14, 2023

(65) Prior Publication Data

US 2025/0203016 A1      Jun. 19, 2025

(51) Int. Cl.
*H04M 15/00*          (2024.01)

(52) U.S. Cl.
CPC ....... *H04M 15/8214* (2013.01); *H04M 15/58* (2013.01)

(58) Field of Classification Search
CPC .. H04M 15/8214; H04M 15/58; H04M 15/00; H04M 15/66; H04M 15/853; H04M 15/854; H04L 12/14; H04L 12/1407; H04W 4/24
See application file for complete search history.

(56) References Cited

U.S. PATENT DOCUMENTS

| | | | |
|---|---|---|---|
| 9,154,362 B1 | 10/2015 | Oakenfull | |
| 2010/0223099 A1 | 9/2010 | Johnson et al. | |
| 2016/0330328 A1* | 11/2016 | Garg ...................... | H04W 4/24 |
| 2017/0347161 A1 | 11/2017 | Sachdeva | |
| 2018/0184264 A1* | 6/2018 | Dulick ................. | H04M 15/80 |
| 2019/0109949 A1* | 4/2019 | Seetharaman .... | H04M 15/8228 |
| 2019/0182838 A1* | 6/2019 | Bondarenko ..... | H04M 15/7652 |
| 2019/0297487 A1* | 9/2019 | Muñoz Sanchez ... | H04L 67/535 |
| 2020/0134364 A1 | 4/2020 | Kuruvilla | |

(Continued)

OTHER PUBLICATIONS

Dmitry Dimov et al., "System and Method for Delivering Customized Promotions to Reduce Churn of Television Users," U.S. Appl. No. 18/535,696, filed Dec. 11, 2023. (33 Pages).

(Continued)

*Primary Examiner* — Md K Talukder
(74) *Attorney, Agent, or Firm* — Jeremiah J. Baunach; Frontier IP Law PLLC

(57)          ABSTRACT

Described herein are systems, methods, and media for allocating complimentary data to subscribers to prevent them from being put in throttling mode. A method includes identifying, from subscribers of a wireless network, one or more subscribers that each have used at least a first predetermined percentage of their respective data quotas for a billing cycle; and predicting that at least one subscriber of the one or more subscribers is to exceed the respective data quota by the end of the billing cycle. The method further includes determining a size of complementary data to be allocated to each of the at least one subscriber such that at least a second percentage of the at least one subscriber is not to exceed the respective data quota; and allocating the complimentary data with the determined size to the at least one subscriber.

20 Claims, 7 Drawing Sheets

(56)  References Cited

U.S. PATENT DOCUMENTS

| | | | |
|---|---|---|---|
| 2020/0162862 A1* | 5/2020 | Munoz-Sanchez | .......................... H04M 15/8214 |
| 2021/0185387 A1 | 6/2021 | Kemp | |
| 2022/0044244 A1 | 2/2022 | Chen | |
| 2022/0415146 A1 | 12/2022 | Albero et al. | |
| 2023/0171569 A1* | 6/2023 | Muralimanohar | .... H04M 15/66 455/406 |
| 2024/0119313 A1 | 4/2024 | Whang et al. | |
| 2024/0185137 A1 | 6/2024 | Atlan et al. | |
| 2024/0323655 A1* | 9/2024 | Sukojo | .................. H04M 15/58 |
| 2025/0061341 A1 | 2/2025 | Mondal et al. | |
| 2025/0117649 A1 | 4/2025 | Ghosh et al. | |
| 2025/0203016 A1* | 6/2025 | Arbuzov | .............. H04M 15/00 |

OTHER PUBLICATIONS

Mikhail Arbuzov et al., "Providing Wireless Services Based on Using Subscriber Geospatial Activity," U.S. Appl. No. 18/535,633, filed Dec. 11, 2023. (28 Pages).

* cited by examiner

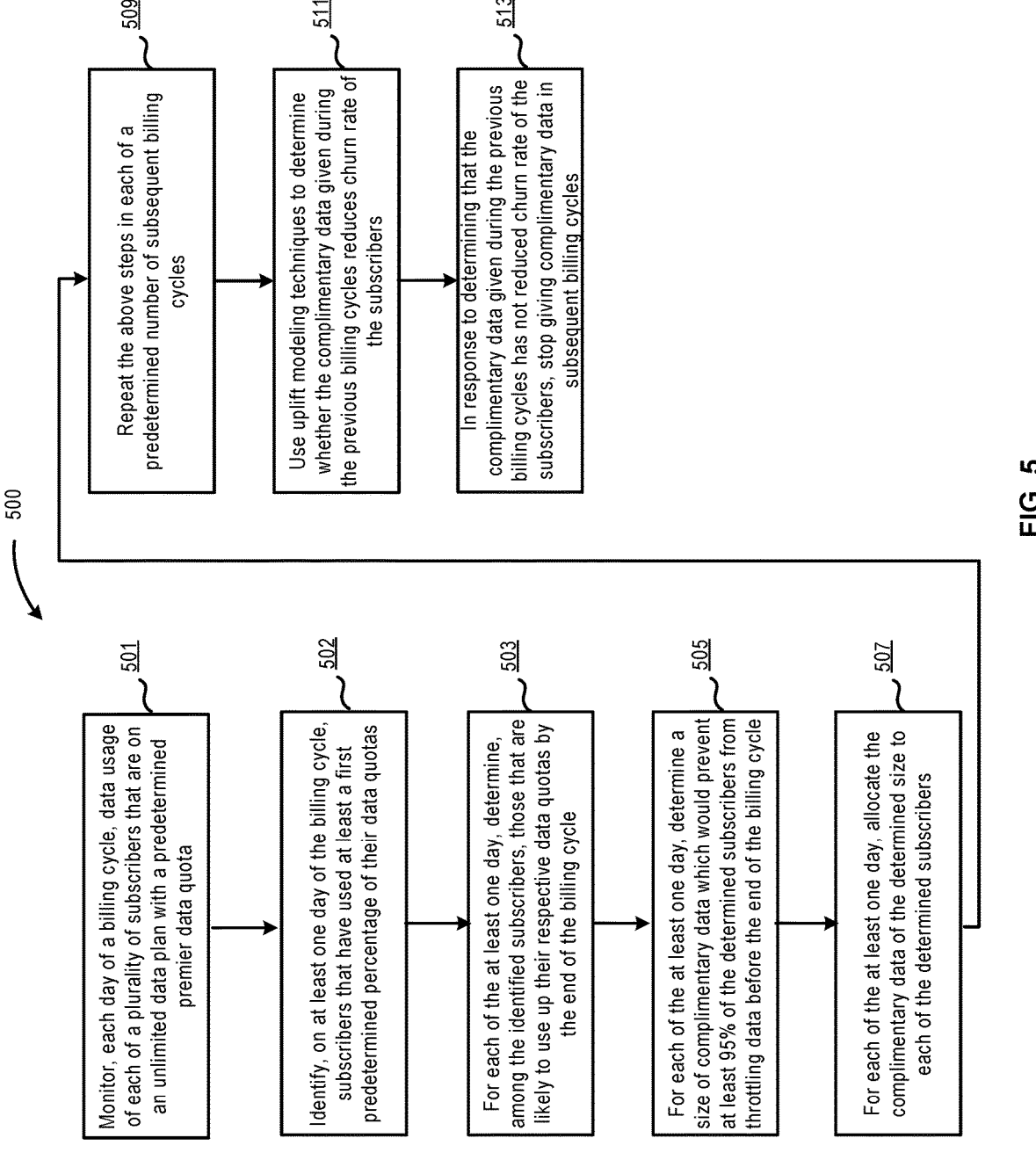

509

Repeat the above steps in each of a predetermined number of subsequent billing cycles

511

Use uplift modeling techniques to determine whether the complimentary data given during the previous billing cycles reduces churn rate of the subscribers

513

In response to determining that the complimentary data given during the previous billing cycles has not reduced churn rate of the subscribers, stop giving complimentary data in subsequent billing cycles

500

501

Monitor, each day of a billing cycle, data usage of each of a plurality of subscribers that are on an unlimited data plan with a predetermined premier data quota

502

Identify, on at least one day of the billing cycle, subscribers that have used at least a first predetermined percentage of their data quotas

503

For each of the at least one day, determine, among the identified subscribers, those that are likely to use up their respective data quotas by the end of the billing cycle

505

For each of the at least one day, determine a size of complimentary data which would prevent at least 95% of the determined subscribers from throttling data before the end of the billing cycle

507

For each of the at least one day, allocate the complimentary data of the determined size to each of the determined subscribers

FIG. 5

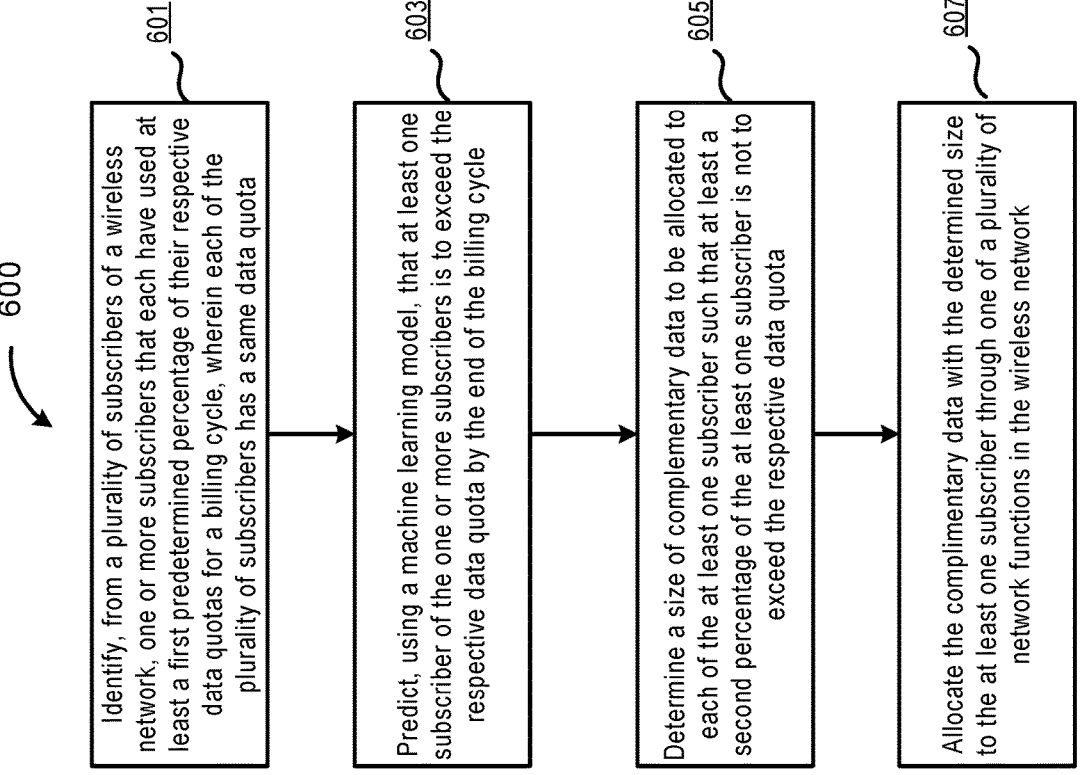

600

601

Identify, from a plurality of subscribers of a wireless network, one or more subscribers that each have used at least a first predetermined percentage of their respective data quotas for a billing cycle, wherein each of the plurality of subscribers has a same data quota

603

Predict, using a machine learning model, that at least one subscriber of the one or more subscribers is to exceed the respective data quota by the end of the billing cycle

605

Determine a size of complementary data to be allocated to each of the at least one subscriber such that at least a second percentage of the at least one subscriber is not to exceed the respective data quota

607

Allocate the complimentary data with the determined size to the at least one subscriber through one of a plurality of network functions in the wireless network

FIG. 6

SYSTEM AND METHOD FOR REDUCING SUBSCRIBER CHURN THROUGH COMPLIMENTARY DATA ALLOCATIONS

TECHNICAL FIELD

The present disclosure relates generally to wireless networks, and more particularly relates to a system and method for providing complimentary data to subscribers of a wireless network to prevent their throttling experience to reduce subscriber churn.

BRIEF SUMMARY

In the realm of telecommunications, "unlimited" data plans often come with a caveat. Subscribers may experience throttled data speeds after reaching a certain quota within their billing cycle. This throttling can lead to diminished user experience, resulting in increased subscriber churn. To address this, solutions that proactively mitigate the impact of throttling are needed.

Described herein are systems, methods, and media for allocating complimentary data to subscribers to prevent them from being put in throttling mode. The embodiments can preemptively provide free data to subscribers that are likely to experience throttling speeds based on their historical data usage patterns, thereby reducing subscriber churn.

In an embodiment, a method includes identifying, from a plurality of subscribers of a wireless network, one or more subscribers that each have used at least a first predetermined percentage of their respective data quotas for a billing cycle; and predicting, using a machine learning model, that at least one subscriber of the one or more subscribers is likely to exceed the respective data quota by the end of the billing cycle. The method further includes determining a size of complementary data to be allocated to each of the at least one subscriber that is likely to exhaust the respective data quota by the end of the billing cycle such that at least a second percentage of the at least one subscriber is not to exceed the respective data quota; and allocating the complimentary data with the determined size to the at least one subscriber through one of a plurality of network functions in the wireless network.

In some embodiments of the method, each subscriber has the same unlimited data plan with the same data quota for the billing cycle. Data throttling occurs after the data quota is reached.

In some embodiments of the method, the machine learning model is a deep learning model.

In some embodiments of the method, the wireless network is a 5th generation (5G) network.

In some embodiments of the method, the determining of the size of the complementary data to be allocated to each of the at least one subscriber is performed using quantile regression.

In some embodiments of the method, the network function that allocates the complimentary data with the determined size is a session management function (SMF) of the wireless network.

In some embodiments of the method, the first predetermined percentage is smaller than the second predetermined percentage.

In some embodiments of the method, the identifying, predicting, determining, and allocating are repeated at least once by the end of the billing cycle.

According to other embodiments, the methods can be implemented by a system and/or a computer readable storage medium as described herein.

In an embodiment, the system can be a multi-node cloud system, where the operations for allocating complimentary data to subscribers to prevent them from being put in throttling mode can be distributed across multiple processing nodes to increase the system's scalability, fault tolerance, and performance in terms of processing speed of the system.

Further, data related to the operations can be loaded into a distributed shared memory (DSM) to be accessed by multiple processing nodes. The DSM enhances the system's scalability since it allows more processing nodes to be added as more processing power is needed. As the system expands, it offers increased memory resources to the applications, boosting overall performance. Further, the DSM facilitates the efficient use of memory resources spread across different machines. If a node is grappling with high memory consumption, it has the capability to tap into the unused memory of other nodes, enhancing the adaptability of the cloud-based computing system.

As shown above and in more detail throughout the disclosure, various embodiments of the disclosure provide technical improvements over existing systems for preventing data throttling. These and other features and advantages of the disclosure will become more readily apparent in view of the embodiments described herein and illustrated in this specification.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 5 is a block diagram illustrating a process of allocating complimentary data to subscribers according to an embodiment of the disclosure.

FIG. 6 is a block diagram illustrating another process of allocating complimentary data to subscribers according to an embodiment of the disclosure.

DETAILED DESCRIPTION

The following description, along with the accompanying drawings, sets forth certain specific details in order to provide a thorough understanding of various disclosed embodiments. However, one skilled in the relevant art will recognize that the disclosed embodiments can be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments can be methods, systems, media, or devices. Accordingly, the various embodiments can be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
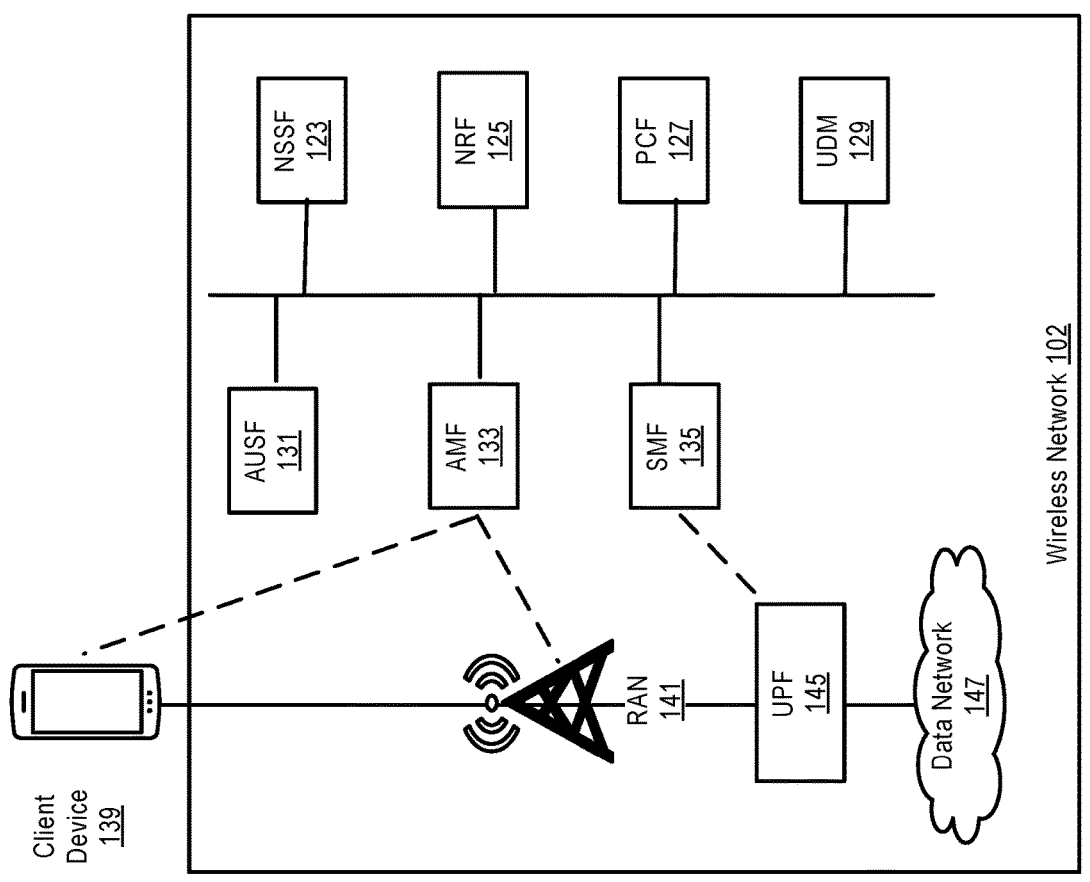
FIG. 1 is a block diagram illustrating an example of a wireless network in which various embodiments of the disclosure are implemented.

FIG. 1 is a block diagram illustrating an example of a wireless network 102 in which various embodiments of the disclosure are implemented. As shown, a subscriber 139 (e.g., a terminal device such as a smart phone) can establish a connection with a base station (e.g., a RAN 141) of the wireless network 102 to access data and services in the wireless network 102. The wireless network 102 can be 5G compliant network and thus can include a user plane and a control plane that are designed to efficiently transport user-generated data, such as internet traffic, multimedia content, and application data, between subscribers and one or more data networks. The user plane can include subscribers, a radio access network (RAN), a user plane function (UPF), and one or more data networks. The RAN can include 5G base stations for connecting subscribers to a 5G network and can handle data packets transmission over the air interface between subscriber and the base stations. The UPF can interconnect with the data networks, and perform several functions, such as packet routing and forwarding, packet inspections, and QoS (Quality of Service) handling. The data networks can be located outside of the core network of a 5G network. Examples of the data network include Internet and IP multimedia subsystem (IMS).

In FIG. 1, the user plane of the wireless network 102 includes the subscriber 139, the RAN 141, a UPF 145, and a data network 147. The control plane includes a network slice selection function (NSSF) 123 for selecting an appropriate network slice based on user and service requirements, and a network repository function (NRF) 125 for centrally storing profiles of NFs in the wireless network 102. The NRF can provide a standard API that enables the NFs to register their profiles with the NRF, through which the registered NFs may discover each other and consume each other's services. The control plane further includes a policy control function (PCF) 127 used to develop and implement policies in the wireless network 102, and a unified data management (UDM) 129 functioning as a central repository for storing user-related data, such as subscriber profiles, authentication credentials, and service subscriptions. The control plane further includes an authentication server function (AUSF) 131 that handles user authentication and key management, validates the identity of subscribers, and provides security credentials for establishing secure communication. The control plane can further include an access and mobility management function (AMF) 133 for performing mobility-related functions (e.g., device registration and mobility management), tracking locations of subscribers, and managing handovers between them. Further, the control plane includes a session management function (SMF) 135 for performing session-related functions, such session establishment, session modification, and session termination for subscribers.

More specifically, the SMF 135 controls and manages the UPF 145, which is in charge of packet routing and forwarding, and how user data is routed through the wireless network 102 by establishing, modifying, or releasing Packet Data Unit (PDU) sessions. The PDU sessions can define the set of parameters and the route that IP packets can traverse from a device (UE) to a data network (like the Internet or an enterprise network). Further, the SMF 135 interacts with the PCF 127 to obtain policy rules and make decisions based on them to ensure that user traffic is handled according to the subscriber's policy or subscription details. Additionally, the SMF 135 manages UE IP address allocation and manages the anchor point selection for user plane mobility. Thus, when a device moves between different access networks or different parts of the network, the SMF 135 helps ensure that ongoing sessions are maintained, and there's a seamless handover.

Each of the above components in the control plane as well as the UPF in the user plane for the wireless network 102 is termed as a network function (NF), which can be software-based component that perform specific tasks and operations. These NFs work in conjunction to deliver mobile services and applications to subscribers efficiently and securely. In one embodiment, the NFs in the user plane and the control plane of the wireless network constitute a core of the wireless network.

Figure 2:
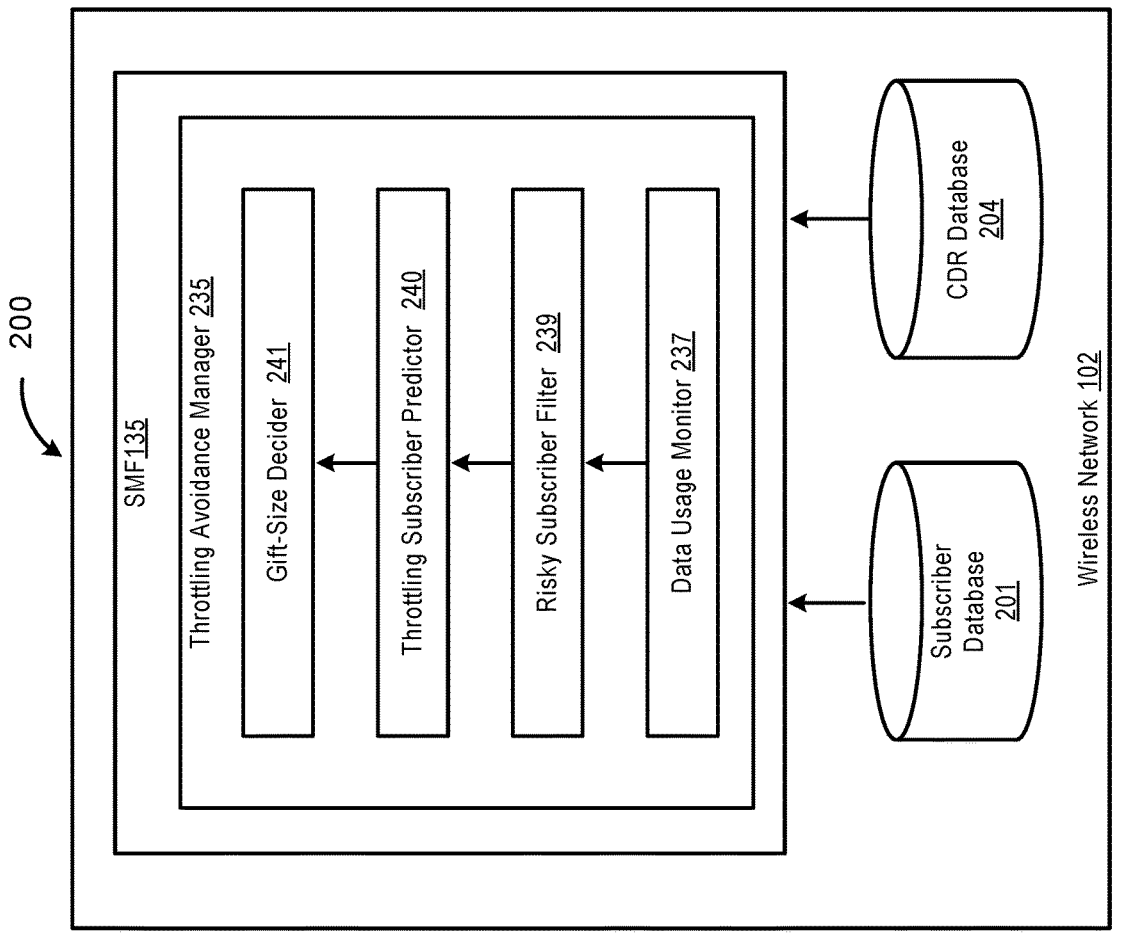
FIG. 2 is a block diagram illustrating a system of allocating complimentary data to subscribers according to an embodiment of the disclosure.

FIG. 2 is a block diagram illustrating a system 200 for allocating complimentary data to subscribers according to an embodiment of the disclosure. As shown, a throttling avoidance manager 235 can be incorporated into the SMF 135 of the wireless network 102. In other embodiments, the throttling avoidance manager 235 can be incorporated into another network function of the wireless network 102 or run on one or more separate servers that do not belong to any network function of the wireless network 102.

In an embodiment, the SMF 135 can have multiple instances that are deployed on multiple serves or nodes for load balancing, redundancy, or geographic distribution. Therefore, the throttling avoidance manager 235, which is incorporated into the SMF 135, can also run on multiple nodes or servers. Additionally, data related to the operations of allocating complimentary data to subscribers can be loaded into a distributed shared memory (DSM) to be accessed by the multiple processing nodes or servers. DSM enhances the scalability of the system 300, allowing more processing nodes to be added as more processing power is needed. As the system expands, DSM offers increased memory resources to applications, boosting overall performance.

The throttling avoidance manager 235 can monitor data usage of each subscriber of the wireless network 102, identify subscribers who are likely to exhaust their data quota before the end of the billing cycle, and then provide them with complimentary data to prevent data throttling experience.

In an embodiment, the throttling avoidance manager 235 can include a data usage monitor 237, a risky subscriber filter 239, a throttling subscriber predictor 240, and a gift-size decider 241. Each of the above components can be a module or a component that can be implemented in software, hardware, or a combination thereof.

The data usage monitor 237 can continuously or periodically monitor data usage of each subscriber based on their respective call detail records in a CDR database 204. The CDR database 204 includes call detail records for each subscriber. These records can include granular details— timestamps, call durations, cell tower connections, and geospatial data indicating the subscriber's physical location during each call. The data usage monitor 237 can periodically (e.g., every day in a billing cycle) query the CDR database 204 for call detail records of each subscriber.

The risky subscriber filter 239 can retrieve data usage from the CDR database 104 for each subscriber on an unlimited data plan and compare their data usages with their data quotas for the billing cycle. In this disclosure, subscribers are on an unlimited data plan that allows them to use an unrestricted amount of data. However, once a premier data quota (also referred to "data quota" in this disclosure) is reached, the data speed is reduced, or throttled, for the remainder of the billing cycle. The risky subscriber filter 239 can identify subscribers that each have used at least a predetermined percentage (e.g., 85%) of their respective data quotas, and classify these subscribers as risky subscribers. In one embodiment, the subscribers on an unlimited data can have the same premier data quota. The identified risky subscribers can be filtered out and passed to the throttling subscriber predictor 240.

The throttling subscriber predictor 240 can utilize a deep learning model, such as a recurrent neural network (RNN) model or a long short-term memory (LSTM) model, to predict the total data usage by the end of the billing cycle for each of the risky subscribers identified by the risky subscriber filter 239. The deep learning model can be trained based on historical usage data and can predict future data usage for a subscriber based on the subscriber's data usage in a period of time in the past (e.g., the last 30 days). For any identified risky subscriber whose total data usage for the billing cycle is predicted to exceed the data quota, the throttling subscriber predictor 240 can add that subscriber to a list. Thus, the throttling subscriber predictor 240 can identify, among the risky subscribers identified by the risky subscriber filter 239, a list of subscribers that are predicted to exhaust their respective data quotas by the end of the billing cycle and consequently be put on throttling mode.

The gift-size decider 241 can receive the list of subscribers that are likely to experience throttling speeds by the end of the billing cycle and determine a size of complimentary data for the list of subscribers. In an embodiment, the gift-size decider 241 can use quantile regression to determine the size of the complimentary data. As mentioned above, each subscriber in the list is on an unlimited data plan and has the same premier data quota. In an embodiment, the size of the complimentary data would enable at least a predetermined percentage (e.g., 95%) of the subscribers on the list to avoid throttling experience by the end of the billing cycle.

In one embodiment, the gift-size decider 241 can use a trained quantile regression model to determine the appropriate size of complimentary data to ensure that at least a predetermined percentage (e.g., 95%) of the subscribers do not exceed their data quotas by the end of the billing cycle. The quantile regression model can be trained using a variety of software packages (e.g., R, Python, or Stata). To predict the size of the complimentary data, a quantile level (e.g., 0.95) can be specified for use by the trained quantile regression model, and the trained quantile regression model can generate an appropriate size of complimentary data. It should be appreciated that the quantile level 0.95 is used here as illustration; other quantile levels can be used in actual implementations.

Figure 3:
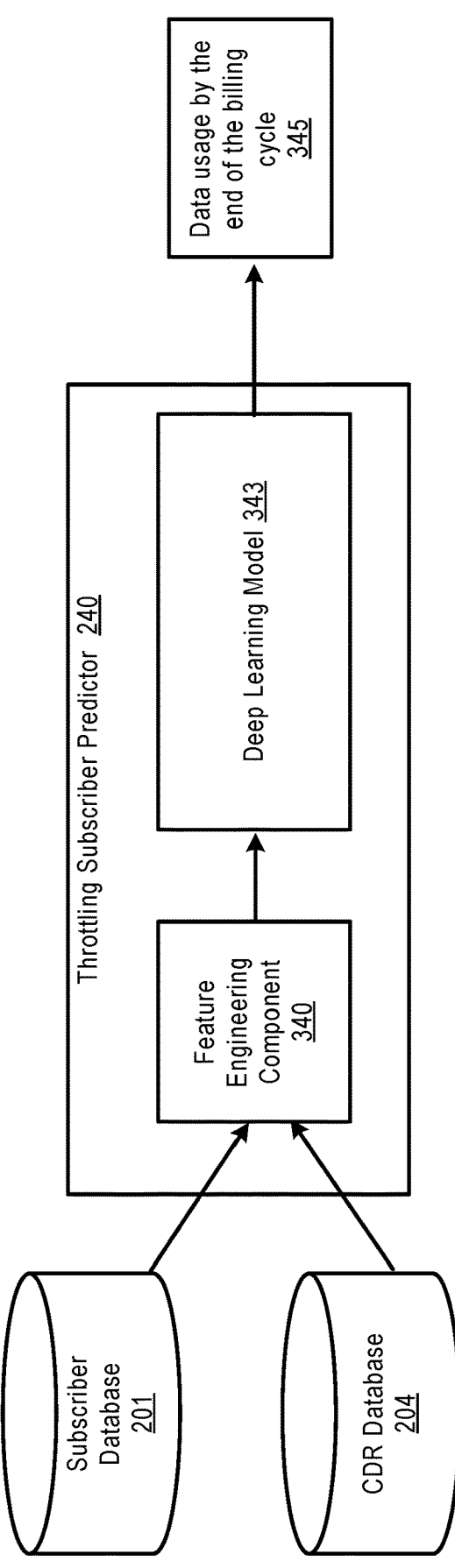
FIG. 3 is a block diagram that further illustrates the throttling subscriber predictor 240 according to an embodiment of the disclosure.

FIG. 3 is a block diagram that further illustrates the throttling subscriber predictor 240 according to an embodiment of the disclosure. The throttling subscriber predictor 240 determines which subscribers, among those identified as having used at least the first predetermined percentage (e.g., 85% of their respective data quotas, are likely to exhaust those quotas and consequently be placed in throttling mode by the end of the billing cycle.

In one embodiment, the throttling subscriber predictor 240 can include a trained deep learning model 343. This model can be a convolutional neural network (CNN), a recurrent neural network (RNN), a long short-term memory network (LSTM), or any other appropriate deep learning model capable of predicting future data usage 345 based on a subscriber's historical data usage patterns.

In an embodiment, the historical data usage provided as input to the throttling subscriber predictor 240 can be prepared by a feature engineering component 340, which can extract historical data usage patterns for a subscriber from the subscriber database 201 and the CDR database 204 during the past period of time (e.g., 30 days). Examples of the extracted features include one or more of: daily usage values; trends within the month; derived metrics such as rolling averages and rates of change; weekend vs. weekday patterns; and any notable events within the month that might have affected data consumption. The feature engineering component 340 can prepare the data through normalization and handling of any missing values.

Figure 4:
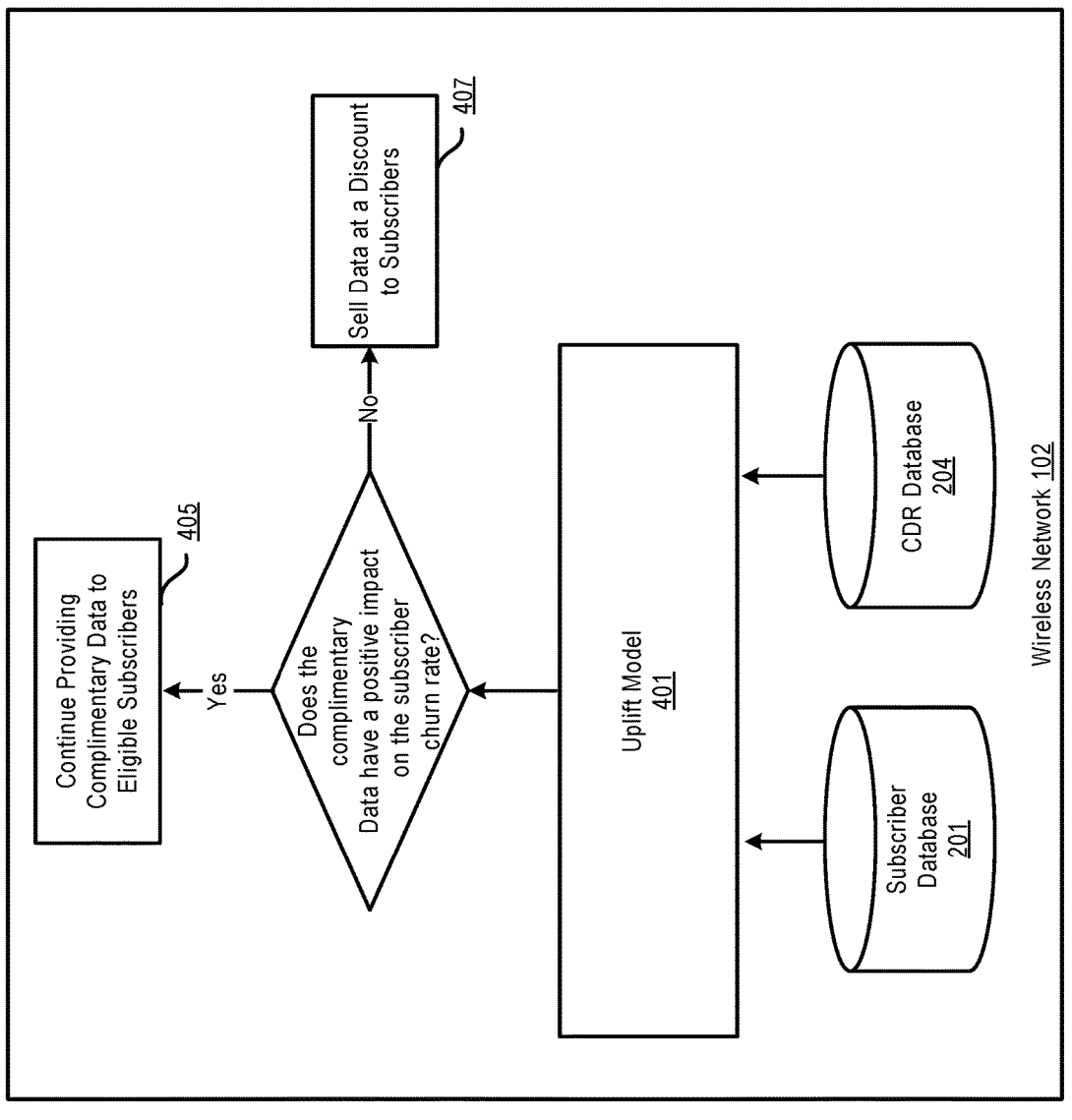
FIG. 4 is a block diagram that illustrates an evaluation process for determining whether complementary data can decrease the churn rate of subscribers, according to an embodiment of the disclosure.

FIG. 4 is a block diagram that illustrates an evaluation process for determining whether complimentary data can decrease the churn rate of subscribers, according to an embodiment of the disclosure.

As shown, an uplift model 401 can be used to determine whether the complimentary data given to some subscribers during the past several billing cycles can reduce the churn rate of the subscribers. If the churn rate is reduced, the wireless service provider that operates the wireless network 102 can continue the complimentary data program as shown at 405; otherwise, the wireless service provider can terminate the complimentary data program and sell the data to the subscribers at a discount instead as shown at 407.

In an embodiment, the uplift model 401 is a trained machine learning model that can identify the difference in outcomes between two groups of subscribers: those who received the complimentary data and those who did not. The evaluation period can span the past 3 months, 6 months, 12 months, or another timeframe, depending on the specific implementation or the wireless service provider's needs.

In an embodiment, the uplift model 401 can be trained using label data. The subscribers can be randomly split into two groups: those that received complimentary data in the past billing cycles and those who did not. Each subscriber is labeled based on the observed outcome.

For instance, subscribers who received complimentary data in at least one billing cycle and did not churn can be labeled as receiving "Positive Impact"; subscribers that received complimentary in at least one billing cycle and still churned can be labeled as receiving "Negative Impact"; subscribers who did not receive any complimentary data during the past billing cycles and who did not churn can be labeled as receiving "No Impact"; and subscribers who did not receive any complimentary data during the past billing cycles and who churned can also be labeled as receiving "No Impact".

The trained the uplift model 401 can be a decision tree model or an ensemble method or another suitable model. If the uplift model 401 predicts a lower churn for those who received complimentary data compared to those who did dot, then the complimentary data can be determined to have a positive effect on reducing churn.

FIG. 5 is a block diagram illustrating a process 500 of allocating complimentary data to subscribers according to an embodiment of the disclosure. The process 500 illustrates a systematic method for managing and allocating complimentary data to subscribers based on their usage patterns, and subsequently evaluating the impact of such allocations on subscriber retention or churn rate. The process 500 can be performed by a processing logic that includes software, hardware, or a combination thereof.

Referring to FIG. 5, at step 501, the processing logic monitors data usage of multiple subscribers, specifically those on unlimited data plans with a set premier data quota, throughout a billing cycle. The processing logic can query a subscriber database and/or a CDR database to obtain the data usage patterns of each subscriber.

At step 502, the processing logic identifies subscribers who have consumed a first predetermined percentage of their allocated premier data quotas. In one implementation, the predetermined percentage can be 85%. It may happen that on some days within the billing cycle none of the subscribers being monitored reach the threshold percentage in terms of data consumption. However, in this embodiment, at least some of the subscribers being monitored on one or more days of the billing cycle reach the threshold percentage.

At step 503, the processing logic, for each of the one or more days, determines which subscribers, among the subscribers that have been determined to have consumed at least the first predetermined percentage of their premier data quotas, are likely to exhaust their respective premier data quotas by the end of the billing cycle. This step can be performed using a trained deep learning model that has been trained on historical data usage and can predict future data usage for each subscriber.

At step 505, the processing logic, for each day under consideration, calculates an appropriate volume of complimentary data. This amount is determined such that providing it would prevent a minimum of a second predetermined percentage (e.g., 95%) of the identified subscribers from reaching a data throttling state before the end of the cycle. This step can be performed using a quantile regression model.

At step 507, the processing logic allocates the determined amount of complimentary data to the identified subscribers for each of the days under consideration. This can be done by crediting the subscribers' accounts with the complimentary data or by allowing them to use the data without being charged. This steps can be performed using the functions of the SMF 135 of the wireless network 102.

At step 509, the processing logic repeats the steps 501-507 over several predetermined subsequent billing cycles, for example, next 6 billing cycles or 12 billing cycles.

At step 511, the processing logic, after the completion of these subsequent billing cycles, uses uplift modeling techniques to analyze whether the provision of complimentary data in previous cycles has effectively reduced the churn rate of the subscribers.

At step 513, the processing logic decides to cease or modify the provision of complimentary data in subsequent billing cycles if it is determined that allocating complimentary data has not reduced the churn rate of the subscribers. Otherwise, the processing logic decides to continue the complimentary data program.

FIG. 6 is a block diagram illustrating another process 600 of allocating complimentary data to subscribers according to an embodiment of the disclosure. The process 600 can be performed by a processing logic that includes software, hardware, or a combination thereof.

At step 601, the processing logic identifies, from a plurality of subscribers of a wireless network, one or more subscribers that each have used at least a first predetermined percentage of their respective data quotas for a billing cycle, wherein each of the plurality of subscribers has the same data quota.

At step 603, the processing logic predicts, using a machine learning model, that at least one subscriber of the one or more subscribers is likely to exceed the respective data quota by the end of the billing cycle.

At step 605, the processing logic determines a size of complementary data to be allocated to each of the at least one subscriber such that at least a second percentage of the at least one subscriber is not to exceed the respective data quota.

At step 607, the processing logic allocates the complimentary data with the determined size to the at least one subscriber through one of a plurality of network functions in the wireless network. In an embodiment, the network function can be the SMF 134 as described in FIG. 1.

Figure 7:
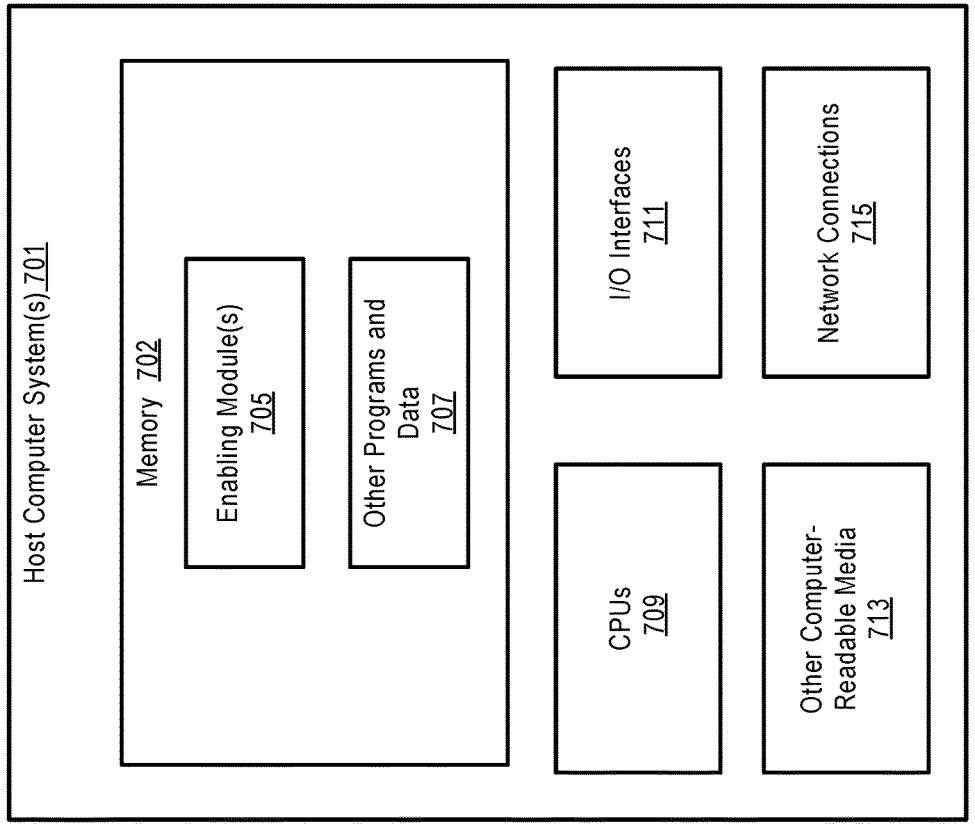
FIG. 7 shows a system diagram that describes an example implementation of a computing system(s) for implementing embodiments described herein.

FIG. 7 shows a system diagram that describes an example implementation of a computing system(s) for implementing embodiments described herein.

The functionality described herein for dynamically allocating complimentary data to subscribers of a wireless network to prevent at least some of the subscribers to be in throttling mode can be implemented either on dedicated hardware, as a software instance running on dedicated hardware, or as a virtualized function instantiated on an appropriate platform, e.g., a cloud infrastructure. In some embodiments, such functionality can be completely software-based and designed as cloud-native, meaning that they are agnostic to the underlying cloud infrastructure, allowing higher deployment agility and flexibility. However, FIG. 7 illustrates an example of underlying hardware on which such software and functionality can be hosted and/or implemented.

In this embodiment, an example host computer system(s) 701 is used to represent one or more of those in various data centers, base stations and cell sites shown and/or described herein that are, or that host or implement the functions of: routers, components, microservices, nodes, node groups, control planes, clusters, virtual machines, network functions (NFs), intelligence layers, orchestrators and/or other aspects described herein, as applicable. In some embodiments, one or more special-purpose computing systems can be used to implement the functionality described herein. Accordingly, various embodiments described herein can be implemented in software, hardware, firmware, or in some combination thereof. Host computer system(s) 701 can include memory 702, one or more central processing units (CPUs) 709, I/O interfaces 711, other computer-readable media 713, and network connections 715.

Memory 702 can include one or more various types of non-volatile (non-transitory) and/or volatile (transitory) storage technologies. Examples of memory 702 can include, but are not limited to, flash memory, hard disk drives, optical drives, solid-state drives, various types of random-access memory (RAM), various types of read-only memory (ROM), neural networks, other computer-readable storage media (also referred to as processor-readable storage media), or the like, or any combination thereof. Memory 702 can be utilized to store information, including computer-readable instructions that are utilized by CPU 709 to perform actions, including those of embodiments described herein.

Memory 702 can have stored thereon enabling module(s) 705 that can be configured to implement and/or perform some or all of the functions of the systems, components and modules described. Memory 702 can also store other programs and data 707, which can include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, intelligence layer software, network functions (NF), artificial intelligence (AI) or machine learning (ML) programs or models to perform the functionality described herein, user interfaces, operating systems, other network management functions, other NFs, etc.

Network connections 715 are configured to communicate with other computing devices to facilitate the functionality described herein. In various embodiments, the network connections 715 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 711 can include video interfaces, other data input or output interfaces, or the like. Other computer-readable media 713 can include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

What is claimed is:

1. A method of allocating complimentary data to subscribers of a wireless network, comprising:

identifying, from a plurality of subscribers of the wireless network, one or more subscribers that each have used at least a first predetermined percentage of their respective data quotas for a billing cycle, wherein the first predetermined percentage is less than their respective data quota;

predicting, using a machine learning model, that at least one subscriber of the one or more subscribers is to exceed the respective data quota by the end of the billing cycle;

determining a size of complementary data to be allocated to each of the at least one subscriber such that at least a second percentage of the at least one subscriber is not to exceed the respective data quota; and allocating the complimentary data with the determined size to the at least one subscriber through one of a plurality of network functions in the wireless network.

2. The method of claim 1, wherein each subscriber of the plurality of subscribers is on an unlimited data plan with the same data quota for the billing cycle, and wherein data throttling occurs after the respective data quota is reached.

3. The method of claim 1, wherein the machine learning model is a deep learning model.

4. The method of claim 1, wherein the wireless network is a 5th generation (5G) network.

5. The method of claim 1, wherein the determining of the size of the complementary data to be allocated to each of the at least one subscriber is performed using quantile regression.

6. The method of claim 1, wherein the network function that allocates the complimentary data with the determined size is a session management function (SMF) of the wireless network.

7. The method of claim 1, wherein the first predetermined percentage is smaller than the second predetermined percentage.

8. The method of claim 1, wherein the identifying, predicting, determining, and allocating are repeated at least once by the end of the billing cycle.

9. A system, comprising:

one or more processors; and one or more memories that are coupled to the one or more processors and storing program instructions for allocating complimentary data to subscribers of a wireless network, wherein the program instructions, when executed by the one or more processors, cause the system to perform operations comprising:

identifying, from a plurality of subscribers of the wireless network, one or more subscribers that each have used at least a first predetermined percentage of their respective data quotas for a billing cycle, wherein the first predetermined percentage is less than their respective data quota;

predicting, using a machine learning model, that at least one subscriber of the one or more subscribers is to exceed the respective data quota by the end of the billing cycle;

determining a size of complementary data to be allocated to each of the at least one subscriber such that at least a second percentage of the at least one subscriber is not to exceed the respective data quota; and allocating the complimentary data with the determined size to the at least one subscriber through one of a plurality of network functions in the wireless network.

10. The system of claim 9, wherein each subscriber of the plurality of subscribers is on an unlimited data plan with the same data quota for the billing cycle, and wherein data throttling occurs after the respective data quota is reached.

11. The system of claim 9, wherein the machine learning model is a deep learning model.

12. The system of claim 9, wherein the wireless network is a 5th generation (5G) network.

13. The system of claim 9, wherein the determining of the size of the complementary data to be allocated to each of the at least one subscriber is performed using quantile regression.

14. The system of claim 9, wherein the network function that allocates the complimentary data with the determined size is a session management function (SMF) of the wireless network.

15. The system of claim 9, wherein the first predetermined percentage is smaller than the second predetermined percentage.

16. The system of claim 9, wherein the identifying, predicting, determining, and allocating are repeated at least once by the end of the billing cycle.

17. A non-transitory computer readable storage medium storing program instructions for allocating complimentary data to subscribers of a wireless network, wherein the program instructions, when executed by one or more processors, cause the one or more processors to perform operations comprising:

identifying, from a plurality of subscribers of the wireless network, one or more subscribers that each have used at least a first predetermined percentage of their respective data quotas for a billing cycle, wherein the first predetermined percentage is less than their respective data quota;

predicting, using a machine learning model, that at least one subscriber of the one or more subscribers is to exceed the respective data quota by the end of the billing cycle;

determining a size of complementary data to be allocated to each of the at least one subscriber such that at least a second percentage of the at least one subscriber is not to exceed the respective data quota; and allocating the complimentary data with the determined size to the at least one subscriber through one of a plurality of network functions in the wireless network.

18. The non-transitory computer readable storage medium of claim 17, wherein each subscriber of the plurality of subscribers is on an unlimited data plan with the same data quota for the billing cycle, and wherein data throttling occurs after the respective data quota is reached.

19. The non-transitory computer readable storage medium of claim 17, wherein the machine learning model is a deep learning model.

20. The non-transitory computer readable storage medium of claim 17, wherein the wireless network is a 5th generation (5G) network.

\* \* \* \* \*